(12) United States Patent
Guthrie et al.

(10) Patent No.: US 9,204,452 B1
(45) Date of Patent: Dec. 1, 2015

(54) CONNECTING TO A NETWORK

(71) Applicant: Google Inc., Mountain View, CA (US)

(72) Inventors: Wade Douglas Guthrie, Mountain View, CA (US); Paul Stewart, Daly City, CA (US)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 14/055,786

(22) Filed: Oct. 16, 2013

(51) Int. Cl.
*H04W 4/00* (2009.01)
*H04W 72/06* (2009.01)
*H04W 72/12* (2009.01)

(52) U.S. Cl.
CPC ............. *H04W 72/06* (2013.01); *H04W 72/12* (2013.01); *H04W 72/1226* (2013.01)

(58) Field of Classification Search
CPC ............ H04W 72/12; H04W 72/1226; H04W 28/0263; H04W 72/06
USPC .......................................................... 370/329
See application file for complete search history.

(56) References Cited

U.S. PATENT DOCUMENTS 5,448,750 A * 9/1995 Eriksson et al. ............ 455/452.2
2007/0275718 A1* 11/2007 Descombes et al. ....... 455/435.1

* cited by examiner

*Primary Examiner* — Sai-Ming Chan
(74) *Attorney, Agent, or Firm* — McDermott Will & Emery LLP (57) ABSTRACT

A system and machine-implemented method for connecting to a network. Plural assignable channels for connecting to a network are determined. History data for one or more of the assignable channels is obtained. The history data indicates a number of prior network connections for the computing device via each of the one or more assignable channels. The plural assignable channels are ranked based on the obtained history data. The plural assignable channels are scanned based on the ranking. The computing device is connected to the network based on the scan.

18 Claims, 4 Drawing Sheets

FIG. 1

| Channel No. 202 | History Of Connecting To Channel 204 |
|---|---|
| 4 | 8 total, with corresponding timestamp data |
| 2 | 5 total, with corresponding timestamp data |
| 10 | 4 total, with corresponding timestamp data |
| 6 | 4 total, with corresponding timestamp data |
| 3 | 2 total, with corresponding timestamp data |
| 1 | 1 total, with corresponding timestamp data |
| . . . | |

CONNECTING TO A NETWORK

BACKGROUND

The present disclosure generally relates to networks, and in particular, to connecting to a wireless network.

Connecting to a wireless local area network (WLAN) requires scanning through a list of WLAN channels. The list of WLAN channels is the set of assignable channels using IEEE 802.11 protocols. The 802.11 workgroup currently documents use in four distinct frequency ranges: 2.4 GHz, 3.6 GHz, 4.9 GHz, and 5 GHz bands. Each range is divided into a multitude of channels.

SUMMARY

The disclosed subject matter relates to a computer-implemented method of connecting to a network. The method comprises determining plural assignable channels for connecting to a network, and obtaining history data for one or more of the assignable channels, wherein the history data indicates a number of prior network connections for a computing device via each of the one or more assignable channels. The method further comprises ranking the plural assignable channels based on the obtained history data, scanning the plural assignable channels based on the ranking, and connecting the computing device to the network based on the scan.

The disclosed subject matter further relates to a system connecting to a wireless network. The system comprises one or more processors, and a machine-readable medium comprising instructions stored therein, which when executed by the processors, cause the processors to perform operations comprising determining plural assignable channels for connecting to a wireless network. The operations further comprise obtaining history data for one or more of the assignable channels, wherein the history data indicates a number of prior wireless network connections for a computing device via each of the one or more assignable channels, and ranking the plural assignable channels based on the obtained history data. In addition, the operations comprise scanning the plural assignable channels based on the ranking, and connecting the computing device to the wireless network based on the scan.

The disclosed subject matter also relates to a machine-readable medium comprising instructions stored therein, which when executed by a system, cause the system to perform operations comprising determining plural assignable channels for connecting to a network. The operations further comprise obtaining history data for one or more of the assignable channels, wherein the history data indicates a number of prior network connections for a computing device via each of the one or more assignable channels, and ranking the plural assignable channels based on the obtained history data. In addition, the operations comprise scanning the plural assignable channels based on the ranking, wherein the scanning comprises batching the plural assignable channels based on the ranking, to generate one or more batches of assignable channels, and connecting the computing device to the network based on the scan.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, connecting to a WLAN requires scanning through a list of WLAN channels. The list of WLAN channels is the set of assignable channels using IEEE 802.11 protocols. The 802.11 workgroup currently documents use in four distinct frequency ranges: 2.4 GHz, 3.6 GHz, 4.9 GHz, and 5 GHz bands. Each range is divided into a multitude of channels.

In order to connect to a network through an access point, a computing device may scan all WLAN channels for a geographic region. The scanning process determines which channels are active and also determines network identifiers (e.g., SSIDs) associated with the active channels. This scanning is generally performed each time a communication device requests to associate with (e.g., become part of or join) a wireless network, and each time the computing device requests to re-associate with a network.

A problem with such channel scanning is delay. The scanning requires a probe request by the computing device, and waiting for the response to the probe request can take approximately 100 milliseconds per device. For example, the scanning can take approximately 4 seconds if there are 40 channels. This amount of time is significant in a wireless-networking environment where associations and re-associations may occur on a frequent and regular basis.

The delay problem can be compounded by the computing device's operating system or other wireless LAN applications, which may request the periodic-comprehensive scans. Since these periodic-comprehensive scans may be performed fairly often (e.g., approximately once a minute), they can adversely affect the throughput and/or performance of the computing device. Thus, it may be desirable to scan for network connectivity in a more efficient manner.

The subject disclosure provides for connecting to a network (e.g., a wireless network). Plural assignable channels for connecting to a network are determined. History data for one or more of the assignable channels is obtained. The history data indicates a number of prior network connections for the computing device via each of the one or more assignable channels. The plural assignable channels are ranked based on the obtained history data. The plural assignable channels are scanned based on the ranking. The computing device is connected to the network based on the scan.

Figure 1:
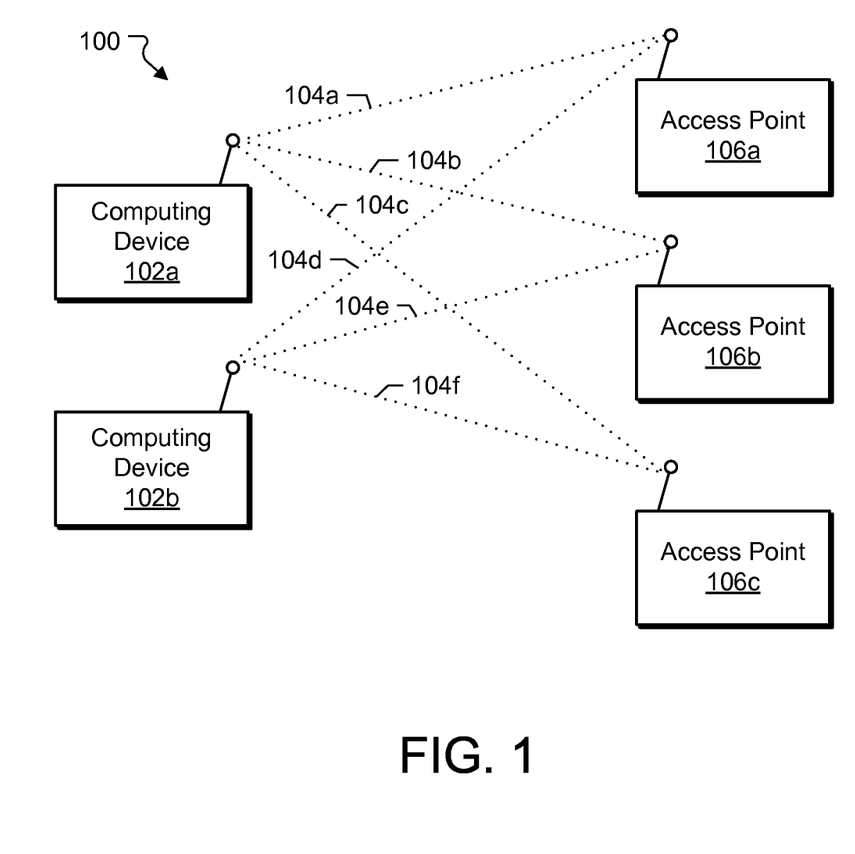
FIG. 1 illustrates an example environment which can provide for connecting to a network.

FIG. 1 illustrates an example environment which can provide for connecting to a network. Communication environment 100 may include one or more computing devices 102a, 102b (hereinafter "102a-b"), which may communicate with one or more access points 106a, 106b, 106c (hereinafter "106a-c") over wireless communication channels 104a, 104b, 104c, 104d, 104e, 104f (hereinafter "104a-f"). Channels 104a-f may comprise bi-directional communication links. Each of computing devices 102a-b can represent various forms of processing devices. Example processing devices can include a desktop computer, a laptop computer, a handheld computer, a personal digital assistant (PDA), a cellular telephone, a network appliance, a camera, a smart phone, a television, an enhanced general packet radio service (EG-PRS) mobile phone, a media player, a navigation device, an email device, a game console, or a combination of any these data devices or other devices that may receive and/or transmit information wirelessly. In example aspects, computing devices 102a-b may also include access points.

In some embodiments, computing devices 102a-b and access points 106a-c may communicate in accordance with one or more communication standards, such as one of the IEEE 802.11(a), (b) or (g) standards, the Digital Video Broadcasting Terrestrial (DVB-T) broadcasting standard, and/or the High performance radio Local Area Network (Hiper-LAN) standard. In other embodiments, computing devices 102a-b may communicate with one or more of access points 106a-c using a multi-carrier transmission technique, such as an orthogonal frequency division multiplexing (OFDM) technique that uses orthogonal subcarriers to transmit information within an assigned spectrum. Other wireless local area network (LAN) and wireless wide area network (WAN) communication techniques may also be suitable for communications between communication units 102a-b and access points 106a-c. Examples of the subject disclosure are applicable to access points which may perform neighborhood discovery, radar detection, and channel-width selection (e.g., per revisions of some IEEE 802.11 standards), among other things.

In addition to facilitating communications between computing devices 102a-b, in some embodiments, access points 106a-c may be coupled with one or more networks, such as an intranet or the Internet, allowing computing devices 102a-b to access such networks. Although FIG. 1 illustrates point-to-point communications (e.g., where an access point synchronizes with a network), embodiments of the subject disclosure may also be suitable to point-to-multipoint communications (e.g., peer-to-peer communications in which communication units may share the responsibility for synchronizing with a network). For example, some embodiments of the subject disclosure are applicable to communications between computing devices 102a-b and access points 106a-c over channels 104a-f in accordance with a basic service set (BSS) mode.

In accordance with some embodiments of the subject disclosure, a computing device (e.g., one of computing devices 102a-b) may connect to a network by determining plural assignable channels for connecting to a network, and obtaining history data for one or more of the assignable channels. The history data indicates a number of prior network connections for the computing device via each of the one or more assignable channels. The computing device ranks the plural assignable channels based on the obtained history data, and scans the plural assignable channels based on the ranking. The computing device connecting to the network based on the scan.

Figure 2:
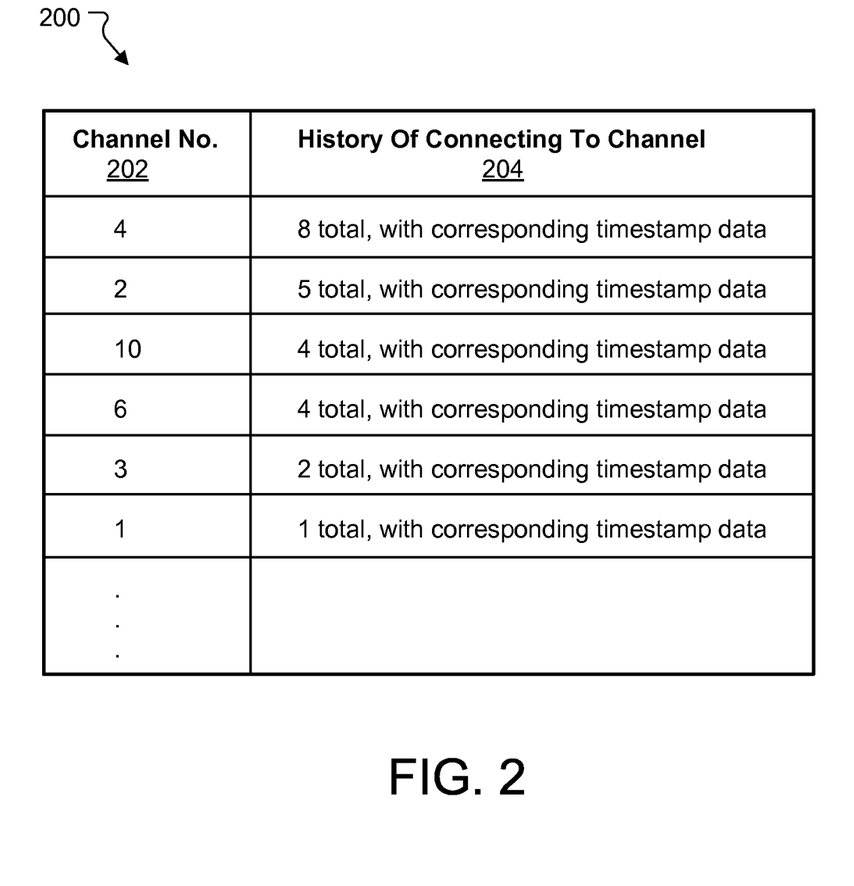
FIG. 2 illustrates an example table with a history of channel connections for a device.

FIG. 2 illustrates an example table with a history of channel connections for a device. As noted above, a computing device may use history data for scanning, with the history data indicating a number of prior network connections using a channel. In FIG. 2, the history data is stored as a table 200 which identifies prior connections by a channel number column 202, and which stores history information for connecting to that channel in a history column 204. Although FIG. 2 illustrates use of a table, the subject technology is not limited to such, and can apply to other data structures which identify prior connections by channel and include history information.

As noted above, a given frequency range (e.g., 2.4 GHz, 3.6 GHz, 4.9 GHz, and 5 GHz bands) may be divided into multiple channels (e.g., approximately 40 total, across all frequency ranges). Channel number column 202 identifies the channels, within a particular geography, which were previously used to connect to a network (e.g., a wireless network). In the example of FIG. 2, channel number column 202 identifies channels 4, 2, 10, 6, 3 and 1 as channels used for prior connections.

For each of the channels identified in channel number column 202, table 200 provides history information within history column 204. History column 204 indicates the number of times that each channel was used for associating with (e.g., connecting to) a network (e.g., via any of access points 106a-c). For example, channel number 4 was used 8 times to connect to a network, channel number 2 was used 5 times to connect to a network, channel number 10 was used 4 times to connect to a network, channel number 6 was used 4 times to connect to a network, channel number 3 was used 2 times to connect to a network, and channel number 1 was used 1 time to connect to a network.

In addition to indicating the number of times that each channel was used for prior connections, history column 204 includes timestamp data corresponding to each of those prior connections. For example, history column 204 may include a timestamp for each prior connection (e.g., 8 timestamps for each of the 8 connections associated with channel 4). In another example, history column 204 may not store all timestamps for each of the prior connections. Instead, history column 204 may store the number of prior connections over preset time periods. Using the example of channel 4, history column 204 may store an indication that of the 8 prior connections, 4 were within the last week, 2 were in the prior week, and the remaining 2 were in the week prior to that.

Using table 200, a computing device (e.g., any of computing devices 102a-b) requesting to connect to a network (e.g., via any of access points 106a-c) can perform a network scan. This scan can be performed without necessarily having to perform a probe request for each assignable channel (e.g., totaling 40 across all frequency ranges). As noted above, conventional scanning can require a probe request by the computing device, and waiting for the response to the probe request can take approximately 100 milliseconds per device. The scanning process determines which channels are active and also determines network identifiers (e.g., SSIDs) associated with the active channels. Using the example of 40 channels across all frequency ranges, the conventional scanning process can take approximately 4 seconds.

Using table 200, the computing device can batch the approximately 40 channels using the prior connection history information in column 204. For example, the computing device can create a first batch of six channels for scanning, and include channels 4, 2, 10, 6, 3 and 1 (e.g., identified in column 202) in the first batch. The computing device can then create additional batches (e.g., a second batch, third batch, fourth batch, etc.). In example aspects, each batch can include 6 channels, for all of the remaining channels (e.g., across all frequency ranges).

Once the channels have been assigned to separate batches, the computing device can scan through the list of channels on a batch-by-batch basis, until an active channel is detected. In example aspects, upon detection of the active channel, the computing device can automatically connect to the network via the active channel. In addition, the computing device can update table 200 to account for the new connection (e.g., by incrementing a counter corresponding to the total count within column 204, or by creating a new entry within table 200 if the active channel was not associated with a prior connection).

Thus, by reducing the number of scans by batching, the amount of scanning time required is likely reduced. For example, if a successful connection occurs within the first batch of six channels (e.g., the channels identified within channel number column 202), the time required for scanning can be reduced to approximately 0.6 seconds (e.g., 6 probe requests, each requiring 100 milliseconds).

It should be noted that the batching of channels is not limited to including all channels identified within column 202 in a first batch. In example aspects, the number of channels per batch is determined as a preset percentage (e.g., 50%) of the number of channels appearing within column 202.

Using the example of 50% and the values within example table 200, the number of channels for the first batch would be 3. Thus, the computing device can assign 3 channels within column 202 in a first batch, and the remaining 3 channels within column 202 in a second batch. The selection of channels within the first batch and second batch can be determined based on the number of prior connections per channel (e.g., assigning channels 4, 2 and 10 to the first batch, since they have a higher number of prior connections). The remaining channels (e.g., approximately 34 channels of 40 remain after 6 channels are assigned) can be assigned in separate batches of 3 channels. The assignment of channels to batches for these remaining channels can be based on channel number, random assignment, or other techniques.

In example aspects, the computing device can use a maximum value in association with the foregoing predetermined percentage. The maximum value represents the number of channels per batch to scan once all channels associated with prior connections (e.g., as identified by column 202) have been considered. This differs from the example described above, in which the number of channels per batch for the remaining channels is based on the predetermined percentage. Thus, if the maximum value is set at 8, batches of 8 channels are scanned after all six channels within column 202 have been scanned (e.g., even if the batch size for the channels within column 202 is lower, for example, 3). In example aspects, use of the maximum value is not limited to the remaining channels, but can also be applied for the channels with prior connections (e.g., previously-seen channels).

In example aspects, the computing device can also use a minimum value in association with the foregoing predetermined percentage. The minimum value represents a minimum number of channels per batch, and the larger of this number and the predetermined percentage is used as the batch size. For example, if the predetermined percentage is 50% with 6 prior connections in table 200, and the minimum value is 5 channels, the batch size will be set as 5.

As noted above, table 200 may also include timestamp information within column 204, where the timestamp information indicates when the prior connections for each channel occurred. For example, column 204 may store this information as an individual timestamp for each prior connection (e.g., 8 timestamps for each of the 8 connections associated with channel 4), or alternatively may store the number of prior connections over preset time periods (e.g., 4 within the last week, 2 in the week prior to that, and 2 in the week prior to that).

In this regard, weights can be applied to channels with prior connections, based on the recency of the prior connections. For example, channels with prior connections within a preset time period (e.g., within the last week) may be favored over other prior connections and assigned higher weights. In example aspects, if the prior connections occurred beyond a threshold time period (e.g., over 3 weeks ago), those prior connections can be disregarded, for example, by decrementing the total count within history column 204.

Thus, by storing history data within table 200, a computing device (e.g., any of computing devices 102a-b) can prioritize channels with prior connection history. These channels can be prioritized by batching, such that the number of probe requests required before detecting (and/or connecting to) an active channel is reduced. The reduction in the number of probe requests can in turn reduce the time required for connecting to a network.

Figure 3:
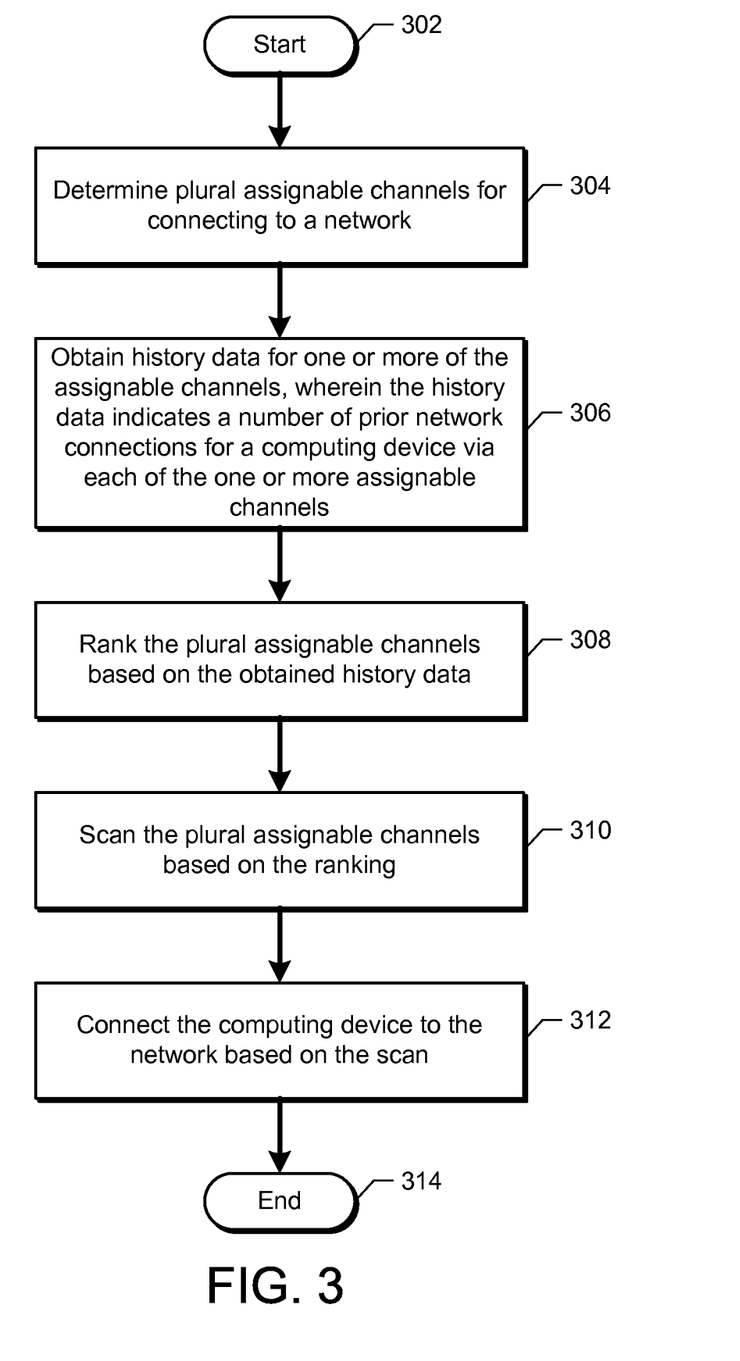
FIG. 3 illustrates an example process for connecting to a network.

FIG. 3 illustrates an example process for connecting to a network (e.g., a wireless network). Following start block 302, plural assignable channels for connecting to a network are determined at block 304.

At block 306, history data for one or more of the assignable channels is obtained. The history data indicates a number of prior network connections for the computing device via each of the one or more assignable channels. The history data can be stored locally on the computing device.

At step 308, the plural assignable channels are ranked based on the obtained history data. The history data can include timestamp information for each of the prior connections. The ranking can be based on the recency of the timestamps.

At step 310, the plural assignable channels are scanned based on the ranking. The scanning can include batching the plural assignable channels based on the ranking, to generate one or more batches of assignable channels. The one or more batches can be prioritized, such that a batch with higher priority includes assignable channels with a greater number of prior connections than a batch with lower priority.

The scanning can be performed on a batch-by-batch basis based on the priority of the one or more batches, until successfully connecting to the network. The batching can be based on a batch size, wherein the batch size is calculated as a predetermined percentage of the number of assignable channels with prior connections.

At step 312, the computing device connects to the network based on the scan. The connecting comprises connecting the computing device to the network via one channel of the assignable channels. A counter for the one channel can be incremented, the counter indicating the number of prior connections for the one channel. The process then ends at end block 314.

Figure 4:
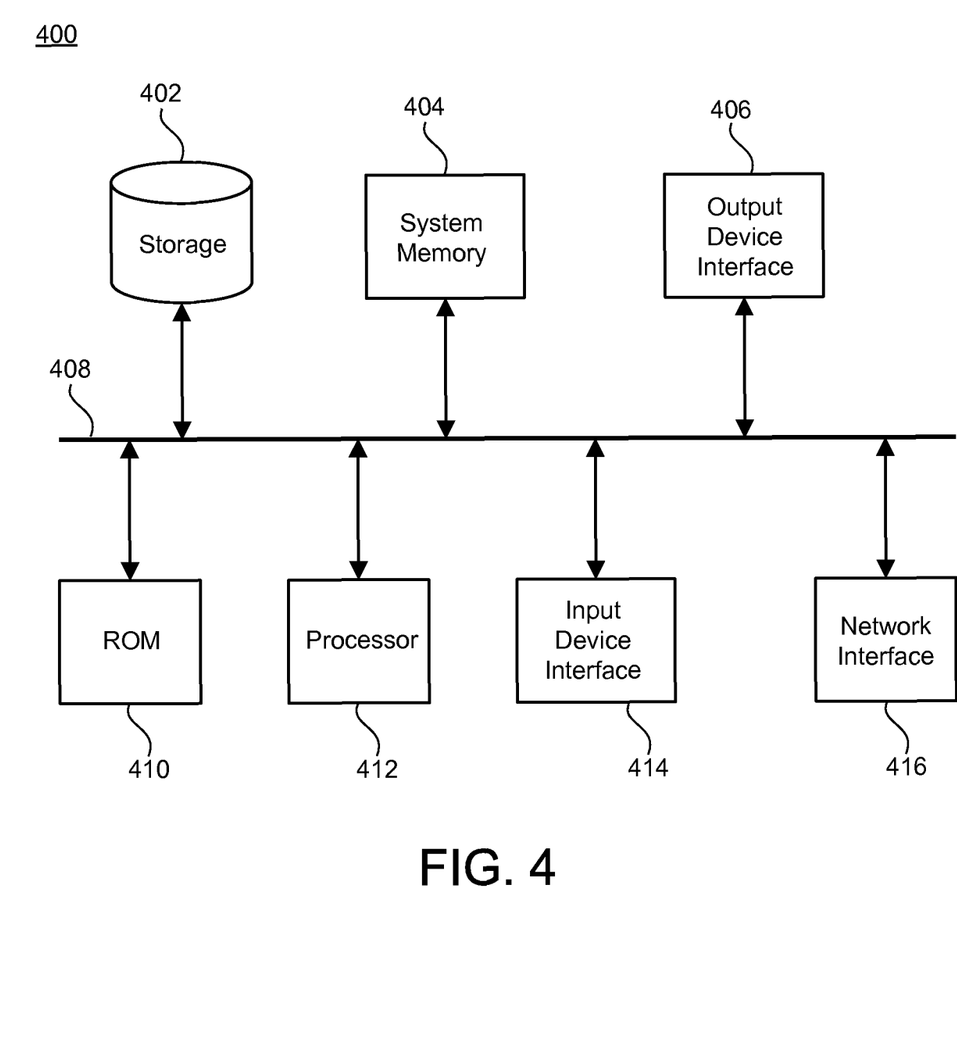
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for connecting to a network. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD- RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method of connecting to a network, the method comprising:
   determining, by a mobile computing device, plural assignable channels for connecting to a network;
   obtaining, by the mobile computing device, history data for one or more of the assignable channels, wherein the history data indicates a number of prior network connections by the mobile computing device to each of the one or more assignable channels;
   ranking, by the mobile computing device, the plural assignable channels based on the obtained history data;
   scanning, by the mobile computing device, the plural assignable channels based on the ranking, wherein the scanning comprises batching the plural assignable channels based on the ranking to generate one or more batches of assignable channels; and connecting the mobile computing device to the network based on the scanning.

2. The method of claim 1, wherein the network is a wireless network using one or more IEEE (Institute of Electrical and Electronics Engineers) 802.11 protocols.

3. The method of claim 1, wherein the connecting comprises connecting the computing device to the network via one channel of the assignable channels.

4. The method of claim 3, further comprising incrementing a counter for the one channel, the counter indicating the number of prior connections for the one channel.

5. The method of claim 1, wherein the one or more batches are prioritized, such that a batch with higher priority includes assignable channels with a greater number of prior connections than a batch with lower priority.

6. The method of claim 5, wherein the scanning is performed on a batch-by-batch basis based on the priority of the one or more batches, until successfully connecting to the network.

7. The method of claim 1, wherein the batching is based on a batch size, and wherein the batch size is calculated as a predetermined percentage of the number of assignable channels with prior connections.

8. The method of claim 1, wherein the history data is stored locally on the mobile computing device.

9. The method of claim 1, wherein the history data comprises timestamp information for each of the prior connections.

10. The method of claim 9, wherein the ranking is based on the recency of the timestamps.

11. A system connecting to a wireless network, the system comprising:
    one or more processors; and
    a machine-readable medium comprising instructions stored therein, which when executed by the processors, cause the processors to perform operations comprising:
        determining, for a mobile computing device, plural assignable channels for connecting to a wireless network;
        obtaining history data for one or more of the assignable channels, wherein the history data indicates a number of prior wireless network connections by the mobile computing device to each of the one or more assignable channels;
        ranking, for the mobile device, the plural assignable channels based on the obtained history data;
        scanning the plural assignable channels based on the ranking, wherein the scanning comprises batching the plural assignable channels based on the ranking, to generate one or more batches of assignable channels; and
        connecting the mobile computing device to the wireless network based on the scanning.

12. The method of claim 1, wherein the connecting comprises connecting the computing device to the wireless network via one channel of the assignable channels.

13. The method of claim 12, the operations further comprising incrementing a counter for the one channel, the counter indicating the number of prior connections for the one channel.

14. The method of claim 11, wherein the one or more batches are prioritized, such that a batch with higher priority includes assignable channels with a greater number of prior connections than a batch with lower priority.

15. The method of claim 14, wherein the scanning is performed on a batch-by-batch basis based on the priority of the one or more batches, until successfully connecting to the wireless network.

16. The method of claim 11, wherein the batching is based on a batch size, and wherein the batch size is calculated as a predetermined percentage of the number of assignable channels with prior connections.

17. The method of claim 1, wherein the history data is stored locally on the mobile computing device.

18. A non-transitory machine-readable medium comprising instructions stored therein, which when executed by a system, cause the system to perform operations comprising:
    determining, by a mobile computing device, plural assignable channels for connecting to a network;
    obtaining, by the mobile computing device, history data for one or more of the assignable channels, wherein the history data indicates a number of prior network connections by the mobile computing device to each of the one or more assignable channels;
    ranking, by the mobile computing device, the plural assignable channels based on the obtained history data;
    scanning, by the mobile computing device, the plural assignable channels based on the ranking, wherein the scanning comprises batching the plural assignable channels based on the ranking, to generate one or more batches of assignable channels; and
    connecting the mobile computing device to the network based on the scanning.

* * * * *

UNITED STATES PATENT AND TRADEMARK OFFICE
CERTIFICATE OF CORRECTION

PATENT NO.        : 9,204,452 B1
APPLICATION NO.   : 14/055786
DATED             : December 1, 2015
INVENTOR(S)       : Wade Douglas Guthrie et al.

Page 1 of 1

It is certified that error appears in the above-identified patent and that said Letters Patent is hereby corrected as shown below:

In the Claims

Claim 12, Column 12, Line 6, "The method of claim 1," should read --The method of claim 11,--.

Claim 17, Column 12, Line 26, "The method of claim 1," should read --The method of claim 11,--.

Signed and Sealed this
Twentieth Day of August, 2019

Andrei Iancu
*Director of the United States Patent and Trademark Office*